(12) United States Patent
Ma et al.

(10) Patent No.: US 11,534,717 B2
(45) Date of Patent: Dec. 27, 2022

(54) AMMONIA DESULPHURIZATION AND OXIDATION APPARATUS AND METHOD

(71) Applicant: SHANGHAI LANKE ENVIRONMENTAL TECHNOLOGY CO., LTD., Shanghai (CN)

(72) Inventors: Hongxi Ma, Shanghai (CN); Wenjun Zhang, Shanghai (CN); Lanjun Mao, Shanghai (CN); Xiangli Meng, Shanghai (CN); Guohui Sun, Shanghai (CN)

(73) Assignee: SHANGHAI LANKE ENVIRONMENTAL TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/642,960

(22) PCT Filed: Sep. 27, 2019

(86) PCT No.: PCT/CN2019/108758
§ 371 (c)(1),
(2) Date: Mar. 15, 2022

(87) PCT Pub. No.: WO2021/051448
PCT Pub. Date: Mar. 25, 2021

(65) Prior Publication Data
US 2022/0331735 A1     Oct. 20, 2022

(30) Foreign Application Priority Data

Sep. 17, 2019   (CN) .......................... 201910877286.4

(51) Int. Cl.
*B01D 53/14*     (2006.01)
*B01D 53/18*     (2006.01)
(Continued)

(52) U.S. Cl.
CPC ....... *B01D 53/504* (2013.01); *B01D 53/1406* (2013.01); *B01D 53/1481* (2013.01);
(Continued)

(58) Field of Classification Search
CPC ............ B01D 53/1406; B01D 53/1481; B01D 53/1493; B01D 53/185; B01D 53/502;
(Continued)

(56) References Cited

U.S. PATENT DOCUMENTS 9,272,908 B2     3/2016   Suchak et al.
10,143,957 B2    12/2018  Li et al.

FOREIGN PATENT DOCUMENTS

CN     101 053 745 A   *  10/2007
CN     101085410 A        12/2007
(Continued)

*Primary Examiner* — Timothy C Vanoy
(74) *Attorney, Agent, or Firm* — Bayramoglu Law Offices LLC (57) ABSTRACT

An efficient ammonia desulphurization and oxidation apparatus includes a desulphurization tower, where spray layers in multiple stages and a tower reactor are sequentially arranged in the desulphurization tower; a first gas-liquid distribution plate, a second gas-liquid distribution plate, and a third gas-liquid distribution plate are sequentially arranged in the tower reactor; an ammonia distribution zone is formed between the first and second gas-liquid distribution plates, and an ammonia water distributor is further arranged between the first gas-liquid distribution plate and the second gas-liquid distribution plate in the ammonia distribution zone; an absorption zone is formed between the second and third gas-liquid distribution plates; an oxidation zone is formed between the third gas-liquid distribution plate and a bottom of the tower; in the oxidation zone, oxidizing air distributors in multiple stages are arranged at a lower side of the third gas-liquid plate.

11 Claims, 3 Drawing Sheets

(51) Int. Cl.
  *B01D 53/50* (2006.01)
  *B01D 53/78* (2006.01)
  *B01D 53/79* (2006.01)

(52) U.S. Cl.
  CPC ....... *B01D 53/1493* (2013.01); *B01D 53/185* (2013.01); *B01D 53/502* (2013.01); *B01D 53/78* (2013.01); *B01D 53/79* (2013.01); *B01D 2251/2062* (2013.01)

(58) Field of Classification Search
  CPC ...... B01D 53/504; B01D 53/78; B01D 53/79; B01D 2251/2062
  See application file for complete search history.

(56) References Cited

FOREIGN PATENT DOCUMENTS

| | | | | |
|---|---|---|---|---|
| CN | 101474528 A | | 7/2009 | |
| CN | 201454395 U | | 5/2010 | |
| CN | 202105585 U | | 1/2012 | |
| CN | 206350984 U | | 7/2017 | |
| CN | 109012086 A | | 12/2018 | |
| CN | 109260895 A | | 1/2019 | |
| CN | 208356491 U | | 1/2019 | |
| CN | 109 289 475 A | * | 2/2019 | ........... B01D 47/063 |
| CN | 208512251 U | | 2/2019 | |
| JP | H1147538 A | | 2/1999 | |

\* cited by examiner

AMMONIA DESULPHURIZATION AND OXIDATION APPARATUS AND METHOD

CROSS REFERENCE TO THE RELATED APPLICATIONS

This application is the national phase entry of International Application No. PCT/CN2019/108758, filed on Sep. 27, 2019, which is based upon and claims priority to Chinese Patent Application No. 201910877286.4, filed on Sep. 17, 2019, the entire contents of which are incorporated herein by reference.

TECHNICAL FIELD

The present disclosure belongs to the technical fields of environmental protection and chemical industry, and relates to an ammonia desulphurization and oxidation apparatus and method.

BACKGROUND

Sulfur dioxide is one of the main pollutants in combustion flue gases of sulfur fuels (such as coal and oil). Sulfur dioxide will bring environmental problems such as acid rain and cause physiological hazard to the human body after entering the atmosphere, and thus is the main pollutant for waste gas treatment.

At present, wet desulphurization is mainly employed for the removal of $SO_2$ in a flue gas, and absorbents widely used in the wet desulphurization include $CaCO_3$ (limestone-gypsum desulphurization), NaOH (sodium desulphurization), MgO (magnesium desulphurization), and $NH_3$ (ammonia desulphurization). Because the ammonia desulphurization process does not produce waste water and a by-product $(NH_4)_2SO_4$ thereof can be used as a fertilizer for resource recycling, the ammonia desulphurization process has great technical advantages.

Compared with the calcium desulphurization and the sodium desulphurization, the ammonia desulphurization shows higher requirements for the oxidation rate. If the oxidation rate is low, unoxidized ammonium sulfite will be decomposed in an ammonium sulfate concentration operation to release ammonia and acid gases, resulting in peculiar odor in an operating room, environmental and equipment corrosion, and the like. Due to the characteristics of the absorbent $NH_3$ itself, the oxidation rate is restricted by factors such as temperature and pH. A relationship between the oxidation rate and the pH is as follows: the higher the pH, the worse the oxidation efficiency, and the lower the pH, the higher the oxidation efficiency; and the higher the pH, the higher the absorption efficiency for $SO_2$, and the lower the pH, the lower the absorption efficiency for $SO_2$. Due to the difference between the oxidation rate and the absorption efficiency, it has been a difficult problem in the industry to consider both efficient oxidation and efficient absorption in recent years.

In order to improve the oxidation efficiency of ammonia desulphurization, Chinese patent CN 208356491 U proposes an ammonia desulphurization and oxidation apparatus of ammonium sulfite, which adopts multiple layers of packing assemblies and liquid distributed rings among the assemblies to increase a gas-liquid contact specific surface area (SSA) and improve the oxidation rate of ammonium sulfite. Although this packing structure can improve the gas-liquid mass transfer efficiency, this packing structure is easily blocked due to the easy saturation and precipitation of ammonium sulfate in an ammonia desulphurization slurry.

Chinese patent CN 109260895 A proposes an oxidation circulation tank device and method for ammonia desulphurization with function-oriented product partitions, where an oxidation circulation tank is divided by a tank wall plate and a partition plate into three zones: a single-phase liquid zone, an oxidation zone, and a reduction zone, which improves the $SO_2$ absorption capacity of an absorption slurry and strengthens a desulphurization effect for a flue gas. Since this device separates the oxidation zone from the circulation absorption zone, it is difficult to implement industrially. Moreover, a sulfite will be decomposed to cause ammonia escape and tailing after being circulated in a tower for a long time and not oxidized, and further cause a short oxidation residence time, which easily leads to insufficient oxidation.

Chinese patent CN 208512251 U proposes a combined oxidation device suitable for ammonia desulphurization. This device is an independent tank with optimized gas-liquid distribution, and an aeration pipe and a gas-liquid distributor are arranged inside the device. This device makes the oxidation efficiency of ammonium sulfite reach 99.5% or more by increasing a gas-liquid contact area. Although this patent solves the problem of oxidation, it is difficult to individually implement the separation from a $SO_2$ absorption phase.

Chinese patent CN201120164401.2 discloses a double-oxidation ammonia desulphurization device, which improves the absorption efficiency, makes the desulphurization efficiency 95% or more, can obtain an ammonium sulfate crystal with a purity of 99% or more, and reduces an ammonia escape amount to less than 8 $mg/m^3$. However, in the device of this patent, a flue gas directly enters a pre-washing tower after being dedusted, which leads to a high requirement for the manufacturing process of the pre-washing tower, requires more investment, and reduces a service life of the pre-washing tower. The low-temperature flue gas after desulphurization is directly discharged through a chimney, and the low-temperature flue gas is highly corrosive to the chimney and affects a service life of the chimney.

On the basis of Chinese patent CN201120164401.2, Chinese patent CN 206350984 U adopts a flue gas heat exchange device to make an original flue gas first subjected to a heat exchange treatment with a flue gas discharged from a desulphurization tower through the device, such that a temperature of the original flue gas is lowered, which reduces the requirement for the manufacturing process of the pre-washing tower and the cost thereof, and increases a temperature of a flue gas discharged from a chimney to reduce the corrosion to the chimney and prolong a service life of the chimney. This patent includes a dust collector, a pre-washing tower, a desulphurization tower, and a heat exchanger, involves a complicated process, and shows high material requirements for the pre-washing tower.

All the above patents focus on oxidation or absorption, and are difficult to achieve the improvement in both oxidation and absorption efficiency. Thus, this is also a technical problem that those skilled in the art urgently need to solve.

SUMMARY

In order to solve the problem of improvement of both oxidation and absorption efficiency for ammonia desulphurization, the present disclosure provides an efficient ammonia desulphurization and oxidation apparatus and method. Through non-mechanical partition, a desulphurization tower reactor is divided into an ammonia distribution zone, an absorption zone, and an oxidation zone, and a fluid stirrer and multiple layers of gas-liquid distribution plates are specially designed, such as to optimize the gas-liquid and liquid-liquid mass transfer and improve the oxidizing air utilization and the oxidation efficiency, such that the absorption and oxidation can both be optimized, and the desulphurization efficiency of greater than 99.5% and the oxidation efficiency of greater than 99% can be finally achieved.

A first objective of the present disclosure is to provide an ammonia desulphurization and oxidation apparatus, which adopts the following technical solutions:

An ammonia desulphurization and oxidation apparatus is provided, including a desulphurization tower, where spray layers in multiple stages and a tower reactor are sequentially arranged from top to bottom in the desulphurization tower; a first gas-liquid distribution plate, a second gas-liquid distribution plate, and a third gas-liquid distribution plate are sequentially arranged from top to bottom in the tower reactor.

An ammonia distribution zone is formed between the first gas-liquid distribution plate and the second gas-liquid distribution plate, and an ammonia water distributor is further arranged between the first gas-liquid distribution plate and the second gas-liquid distribution plate in the ammonia distribution zone.

An absorption zone is formed between the second gas-liquid distribution plate and the third gas-liquid distribution plate.

An oxidation zone is formed between the third gas-liquid distribution plate and a bottom of the tower; in the oxidation zone, oxidizing air distributors in multiple stages are arranged at a lower side of the third gas-liquid plate, and each of the oxidizing air distributors in multiple stages is correspondingly provided with a gas-liquid plate; and a fluid stirrer for increasing gas-liquid contact is further arranged above the oxidizing air distributor.

Preferably, a secondary oxidizing air distributor, a fourth gas-liquid distribution plate, a primary oxidizing air distributor, and a fluid stirrer may be sequentially arranged from bottom to top between the third gas-liquid distribution plate and the bottom of the tower in the oxidation zone.

Preferably, the fluid stirrer may include a closed coil pipe and a plurality of fluid distribution pipes on the coil pipe that communicate with the coil pipe; and the fluid distribution pipes may be each a short pipe that is inclined downward and forms an included angle a with a tangent line of the coil pipe.

The fluid stirrer may communicate with a stirring/circulating pump located outside the tower through a fluid conveying pipe; and the stirring/circulating pump may communicate with the bottom of the desulphurization tower.

Further, the included angle a between the fluid distribution pipes and the tangent line of the coil pipe may be 40° to 60°.

Preferably, the fluid distribution pipes may be evenly distributed along a circumference of the coil pipe.

Preferably, a diameter of the fluid distributor may be $D_1$, and a relationship between $D_1$ and a diameter Do of the tower may be as follows: $D_1$=0.3 to 0.8 Do.

Preferably, the fluid distribution pipes may each have a length of 30 mm to 50 mm; and/or, 6 to 16 fluid distribution pipes may be arranged on the fluid distributor.

Further, a distance between the primary oxidizing air distributor and the secondary oxidizing air distributor may be 1,000 mm to 2,000 mm, and a distance between the secondary oxidizing air distributor and the bottom of the tower may be 700 mm to 1,000 mm.

Further, the fourth gas-liquid distribution plate may be arranged 300 mm to 500 mm above the secondary oxidizing air distributor, the fluid stirrer may be arranged 500 mm to 800 mm above the primary oxidizing air distributor, and the third gas-liquid distribution plate may be arranged 200 mm to 300 mm above the fluid stirrer.

Further, a distance between the first gas-liquid distribution plate and the second gas-liquid distribution plate may be 400 mm to 600 mm, and the ammonia water distributor may be located between the first gas-liquid distribution plate and the second gas-liquid distribution plate.

Further, the first gas-liquid distribution plate of the ammonia distribution zone may be arranged at a position 500 mm to 1,000 mm lower than a normal liquid level.

Further, the first gas-liquid distribution plate, the second gas-liquid distribution plate, the third gas-liquid distribution plate, and the fourth gas-liquid distribution plate may be each a perforated plate with a porosity of 30% to 45%, a perforation diameter do of 5 mm to 10 mm, and a perforation spacing $d_1$=(2-5) do.

Preferably, the absorption zone may be connected to a spray liquid circulating pump through a pipeline, and the spray liquid circulating pump may be connected to the spray layers on an upper part of the desulphurization tower through a pipeline; and the spray layer can be arranged into different numbers of stages according to actual needs, namely, different numbers of layers.

Further, a mist eliminator may be further provided at an upper side of the spray layer in the desulphurization tower.

Preferably, the ammonia water distributor may be arranged as a branched distributor including an ammonia water distribution main pipe and a plurality of ammonia water distribution branch pipes parallel to each other in a horizontal direction, and the ammonia water distribution main pipe may be connected to the ammonia water distribution branch pipes;

a spacing between two adjacent ammonia water distribution branch pipes may be $L_1$, two rows of distribution holes each with a diameter of $L_0$ may be formed on each of the ammonia water distribution branch pipes, and a spacing between two adjacent distribution holes in the same row may be $L_2$; the two rows of distribution holes may be symmetrically distributed in a vertical direction, and each of the two rows of distribution holes may form an included angle of β with the vertical direction; β may have a value range of 50° to 80°;

the two rows of distribution holes on the same ammonia water distribution branch pipe may be staggered; and $L_1$ may have a value range of 100 mm to 200 mm, $L_2$ may have a value range of 50 mm to 150 mm, and $L_0$ may have a value range of 10 mm to 25 mm.

Preferably, the oxidizing air distributor may be arranged as a branched distributor including an oxidizing air distribution main pipe and a plurality of oxidizing air distribution branch pipes parallel to each other in the horizontal direction, and the oxidizing air distribution main pipe may be connected to the oxidizing air distribution branch pipes;

a spacing between two adjacent oxidizing air distribution branch pipes may be $b_1$, two rows of distribution holes each with a diameter of $b_0$ may be formed on each of the oxidizing air distribution branch pipes, and a spacing between two adjacent distribution holes in the same row may be $b_2$; the two rows of distribution holes may be symmetrically distributed in the vertical direction, and each of the two rows of distribution holes may form an included angle of α with the vertical direction; α may have a value range of 15° to 25°;

the two rows of holes on the same oxidizing air distribution branch pipe may be staggered; and $b_1$ may have a value range of 40 mm to 100 mm, $b_2$ may have a value range of 20 mm to 50 mm, and $b_0$ may have a value range of 5 mm to 10 mm.

Preferably, an ammonium sulfate extraction port may be formed on the stirring/circulating pump to quantitatively discharge an ammonium sulfate solution into an ammonium sulfate concentration unit.

A second objective of the present disclosure is to provide an ammonia desulphurization and oxidation method, including the following steps:

S1. circularly spraying a slurry in a tower, such that the slurry is in countercurrent contact with a $SO_2$-containing flue gas and absorbs $SO_2$ to form an acid-rich slurry, and the acid-rich slurry falls into a tower reactor and enters an ammonia distribution zone through a first gas-liquid distribution plate under the action of gravity, and then is mixed with ammonia water distributed from an ammonia water distributor in the ammonia distribution zone to allow a neutralization reaction, where sulfurous acid and ammonium bisulfite are converted into ammonium sulfite and the acid-rich slurry becomes a neutralized slurry;

S2. under the action of gravity, allowing the neutralized slurry to move downward, enter an absorption zone through a second gas-liquid distribution plate, and contact with oxidizing air escaping from an oxidation zone, such that ammonium bisulfite is subjected to deep neutralization and ammonium sulfite is partly oxidized into ammonium sulfate; and S3. allowing the neutralized slurry to further move downward and enter the oxidation zone through a third gas-liquid distribution plate, and under the action of oxidizing air distributed from oxidizing air distributors in multiple stages, allowing ammonium sulfite to be fully oxidized and converted into ammonium sulfate.

Preferably, a pH value of the ammonia distribution zone may be controlled at 7.2 to 7.8; a pH value of the absorption zone may be controlled at 6 to 7; and a pH value of the oxidation zone may be controlled at 4.5 to 6.

Preferably, in S1, an absorption liquid may be delivered by a spray liquid circulating pump from the absorption zone in the tower reactor to a top of the tower, and then circularly sprayed to absorb $SO_2$; and a $SO_2$-removed gas may rise into a mist eliminator, and may be demisted and then discharged up to standard.

Preferably, in S3, the slurry may be drawn from a bottom of the tower by a stirring/circulating pump, and circulated to a fluid stirrer on an upper part of a primary oxidizing air distributor to form a tangential jet, which drives the vigorous mixing of oxidizing air in the oxidation zone with the slurry; a fourth gas-liquid distribution plate above a secondary oxidizing air distributor may synchronously promote the gas-liquid mass transfer in the oxidation zone, such that the neutralized slurry is fully oxidized to obtain an ammonium sulfate solution; and an ammonium sulfate extraction port may be formed on the stirring/circulating pump to quantitatively discharge an ammonium sulfate solution into an ammonium sulfate concentration unit.

The present disclosure has the following beneficial effects:

1) In the apparatus of the present disclosure, through non-mechanical partition, a desulphurization tower reactor is divided into an ammonia distribution zone, an absorption zone, and an oxidation zone, and a fluid stirrer and multiple layers of gas-liquid distribution plates are specially designed, such as to optimize the gas-liquid and liquid-liquid mass transfer, improve the oxidizing air utilization and the oxidation efficiency, and conduct desulphurization and oxidation in the same tower, such that the absorption and oxidation can both be optimized, and the desulphurization efficiency of greater than 99.5% and the oxidation efficiency of greater than 99% can be finally achieved.

2) By controlling a pH value of the ammonia distribution zone, a pH value of the absorption zone, and a pH value of the oxidation zone in different numerical ranges, the method of the present disclosure enables the neutralization, absorption, and oxidation reactions to be all under the optimal reaction conditions, such as to comprehensively improve the neutralization efficiency of ammonia with sulfurous acid and ammonium bisulfite, the absorption efficiency of the slurry for $SO_2$, and the oxidation efficiency of oxygen for sulfite.

3) The oxidizing air distributor specially designed in the present disclosure makes oxidizing air uniformly distributed downward on an interface of the distributor and makes oxidizing air have a large initial velocity in a phase, such that the gas and the liquid can be thoroughly mixed, and a stroke of the oxidizing air in the slurry is improved because oxygen goes down first and then goes up to contact with the slurry, which improves the gas-liquid contact time and the oxidation efficiency. In addition, the present disclosure adopts multi-stage oxidizing air distribution, which further improves the oxygen utilization.

4) In the present disclosure, the oxidizing air remaining after the oxidation reaction with the slurry in the oxidation zone is completed naturally enters the absorption zone upward, and continues to undergo an oxidation reaction with the slurry, thereby improving the oxidizing air utilization and the absorption efficiency of the slurry for $SO_2$.

5) In the present disclosure, the residual oxidizing air enters the spray absorption zone together with a flue gas, and after the entrained gas-phase pollutants are removed, it is discharged into the atmosphere as is standard after a demisting treatment, resulting in no secondary pollution.

6) The fluid stirrer in the present disclosure forms annular tangential liquid stirring, which makes the oxidation zone nearly in a fully mixed state, improves the mass transfer efficiency and oxidation efficiency, and realizes full mixing and stirring of fluids in the tower under the premise of preventing leakage.

BRIEF DESCRIPTION OF THE DRAWINGS

Preferred implementations will be described below in a clear and easy-to-understand manner in conjunction with the accompanying drawings to further illustrate the above-mentioned characteristics, technical features, advantages, and implementation methods of the present disclosure.

REFERENCE NUMERALS 1 represents a desulphurization tower, 11 represents a first gas-liquid distribution plate, 12 represents a second gas-liquid distribution plate, 13 represents a third gas-liquid distribution plate, 14 represents a fourth gas-liquid distribution plate, 2 represents an ammonia water distributor, 20 represents an ammonia water distribution main pipe, 21 represents an ammonia water distribution branch pipe, 3 represents a fluid stirrer, 30 represents a coil pipe, 31 represents a fluid distribution pipe, 32 represents a fluid conveying pipe, 33 represents a stirring/circulating pump, 4 represents an oxidizing air distributor, 40 represents an oxidizing air distribution main pipe, 400 represents an oxidizing air distribution branch pipe, 41 represents a primary oxidizing air distributor, 42 represents a secondary oxidizing air distributor, 5 represents a spray layer, 50 represents a spray liquid circulating pump, and 6 represents a mist eliminator.

DETAILED DESCRIPTION OF THE EMBODIMENTS

In order to explain the examples of the present disclosure or the technical solutions in the prior art more clearly, the specific implementations of the present disclosure will be described below with reference to the accompanying drawings. Apparently, the accompanying drawings in the following description show merely some examples of the present disclosure, and other drawings and other implementations may be derived from these drawings by a person of ordinary skill in the art without creative efforts.

In order to keep the drawings concise, only components related to the present disclosure are schematically illustrated in each drawing, which do not represent its actual structure as a product.

Example 1

Figure 1:
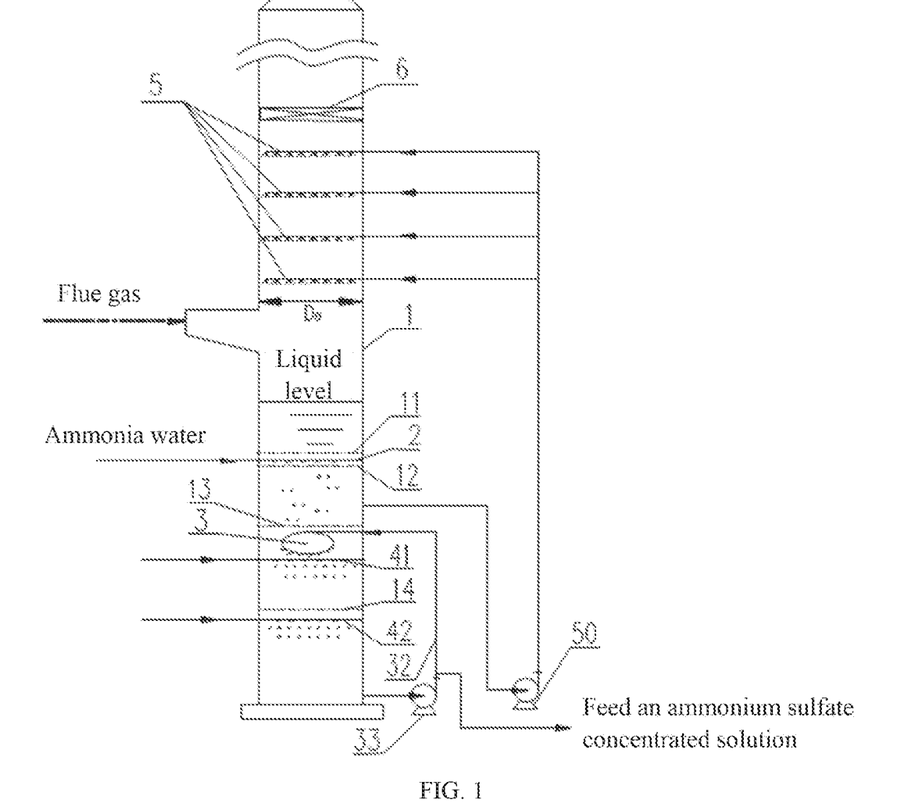
FIG. 1 is a schematic structural diagram of the ammonia desulphurization and oxidation apparatus according to the present disclosure.

As shown in FIG. 1, an ammonia desulphurization and oxidation apparatus is provided, including a desulphurization tower 1, where spray layers in multiple stages 5 and a tower reactor are sequentially arranged from top to bottom in the desulphurization tower 1; a first gas-liquid distribution plate 11, a second gas-liquid distribution plate 12, and a third gas-liquid distribution plate 13 are sequentially arranged from top to bottom in the tower reactor;

an ammonia distribution zone is formed between the first gas-liquid distribution plate 11 and the second gas-liquid distribution plate 12, and an ammonia water distributor 2 is further arranged between the first gas-liquid distribution plate 11 and the second gas-liquid distribution plate 12 in the ammonia distribution zone;

an absorption zone is formed between the second gas-liquid distribution plate 12 and the third gas-liquid distribution plate 13;

an oxidation zone is formed between the third gas-liquid distribution plate 13 and a bottom of the tower; in the oxidation zone, oxidizing air distributors in multiple stages 4 are arranged at a lower side of the third gas-liquid plate, and each of the oxidizing air distributors in multiple stages 4 is correspondingly provided with a gas-liquid plate; and a fluid stirrer 3 for increasing gas-liquid contact is further arranged above the oxidizing air distributor 4.

In this example, the third and fourth gas-liquid distribution plates and the ammonia water distributor 2 form an ammonia distribution zone; the desulphurization tower reactor is divided into an ammonia distribution zone, an absorption zone, and an oxidation zone through non-mechanical partition; and a pH of the ammonia distribution zone, a pH of the absorption zone, and a pH of the oxidation zone can be controlled in different numerical ranges to comprehensively improve the neutralization efficiency of ammonia with sulfurous acid and ammonium bisulfite, the absorption efficiency of the slurry for $SO_2$, and the oxidation efficiency of oxygen for sulfite. Moreover, a fluid stirrer 3 and multiple layers of gas-liquid distribution plates are adopted to improve the gas-liquid and liquid-liquid mass transfer and the oxidizing air utilization, such that both absorption and oxidation are optimized. In addition, according to the actual required treatment conditions and the size and capacity of the desulphurization tower, a multi-stage injection method is adopted to inject oxidizing air, such that oxidizing air coming out from the distribution holes can cause great disturbance to the slurry within a specified range; and any stage of the oxidizing air distributor is correspondingly provided with a gas-liquid plate, which will further improve the gas-liquid mixing efficiency and oxidation efficiency.

As a preferred example, a secondary oxidizing air distributor 42, a fourth gas-liquid distribution plate 14, a primary oxidizing air distributor 41, and a fluid stirrer 3 may be sequentially arranged from bottom to top between the third gas-liquid distribution plate and the bottom of the tower in the oxidation zone. In this example, a two-stage oxidizing air distributor is arranged, which is suitable for desulphurization towers of conventional sizes. Of course, the number of stages of oxidizing air distributors and the corresponding number of gas-liquid distribution plates can be increased according to actual needs. In order to improve the uniformity of fluid stirring, multiple layers of fluid stirrers can also be arranged as required.

Example 2

Figure 2:
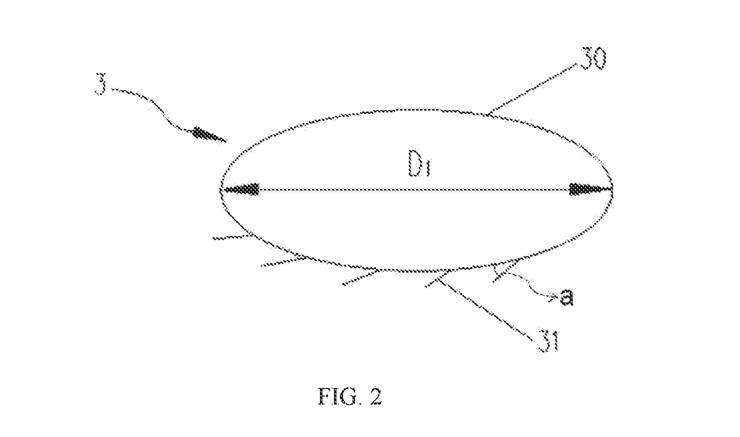
FIG. 2 is a schematic structural diagram of the fluid stirrer in the ammonia desulphurization and oxidation apparatus according to the present disclosure.

As shown in FIG. 2, on the basis of Example 1, the fluid stirrer 3 may include a closed coil pipe 30 and a plurality of fluid distribution pipes 31 on the coil pipe 30 that communicate with the coil pipe; and the fluid distribution pipes 31 may be each a short pipe that is inclined downward and forms an included angle a with a tangent line of the coil pipe 30.

The fluid stirrer 3 communicates with a stirring/circulating pump 33 located outside the tower through a fluid conveying pipe 32; and the stirring/circulating pump 33 communicates with the bottom of the desulphurization tower 1.

In this example, a fluid is drawn by the stirring/circulating pump 33 from the bottom of the tower, pressurized, conveyed into the coil pipe 30 of the fluid stirrer 3 through the fluid conveying pipe 32, and then injected into the tower reactor at a high speed through the fluid distribution pipe 31 inclined downward on the coil pipe 30 to stir the materials in the tower reactor. The short pipe sprays a fluid diagonally downward, such that the materials in the tower produce a disturbance flow pattern similar to that of a paddle stirrer. Therefore, in the present disclosure, the slurry is drawn by the stirring/circulating pump 33 from the bottom of the tower, and circulated to an upper part of the primary oxidizing air distributor 41, where a spiral tangential jet is formed in combination with annular tangential fluid stirring specially designed to drive the vigorous mixing of oxidizing air in a lower part with the slurry; and since the slurry is drawn from the lower part to the upper part, the oxidation zone in a fully mixed state, which improves the mass transfer efficiency and oxidation efficiency, thereby achieving the purpose of simulating mechanical stirring and achieving high-speed stirring of fluids on the basis of preventing leakage.

As a preferred example, the included angle a between the fluid distribution pipes 31 and the tangent line of the coil pipe 30 may be 40° to 60°, which further enables the fluid ejected from the short pipe to be injected into the tower at a high speed for fully stirring.

As another preferred example, the fluid distribution pipes 31 may be evenly distributed along the circumference of the coil pipe 30, such that jets ejected by the fluid distribution pipes 31 are evenly spaced, which can improve the fluid stirring uniformity and fully ensure the stirring effect.

As another preferred example, a diameter of the fluid stirrer 3 may be $D_1$, and a relationship between $D_1$ and a diameter $D_0$ of the tower may be as follows: $D_1$=0.3 to 0.8 Do.

The dimensional relationship in this example can ensure that a fluid flow rate of the coil pipe 20 is equivalent to a fluid flow rate in the fluid conveying pipe 4, such that the stirring and mixing effect is mild and stable.

In practical applications, a length of the fluid distribution pipe 31 in the above example can be set to 30 mm to 50 mm; and 6 to 16 fluid distribution pipes 31 can be arranged on the fluid stirrer 3, and the short pipes are evenly distributed along the circumference.

More preferably, a circulation volume per unit time (per hour) of the stirring/circulating pump 33 may be controlled to be 50 to 100 times a volume of the tower reactor of the desulphurization tower 1; a too-small circulation volume leads to a poor mixing effect, and a too-large circulation volume leads to a high energy consumption; and a fluid is ejected from the fluid distribution pipe 31 at a specified angle to drive the fluid stirring in the tower reactor 3 in a direction of the initial jet velocity while splitting the fluid in the tower to form a disturbance. As shown in the figure, the multiple fluid distribution pipes 31 evenly distributed along the circumference generate multiple jets, which promote the clockwise swirling mixing of the fluids in the tower reactor. Of course, a distribution orientation of the fluid distribution pipes 31 on the coil pipe 30 can also be changed to form counterclockwise swirling mixing. More preferably, an ammonium sulfate extraction port may be formed on the stirring/circulating pump 33 to quantitatively discharge an ammonium sulfate solution into an ammonium sulfate concentration unit.

Example 3

In this example, on the basis of Example 1 or 2, a distance between the primary oxidizing air distributor 41 and the secondary oxidizing air distributor 42 may be 1,000 mm to 2,000 mm, and a distance between the secondary oxidizing air distributor 42 and the bottom of the tower may be 700 mm to 1,000 mm, such that this example can prevent the oxidizing air from entering the stirring/circulating pump 33 to cause cavitation erosion.

Alternatively, the fourth gas-liquid distribution plate 14 may be arranged 300 mm to 500 mm above the secondary oxidizing air distributor 42, the fluid stirrer 3 may be arranged 500 mm to 800 mm above the primary oxidizing air distributor 41, and the third gas-liquid distribution plate 13 may be arranged 200 mm to 300 mm above the fluid stirrer 3. In this example, a gas-liquid distribution plate is arranged above each stage of the two-stage oxidizing air distributor to prevent the oxidizing air from accumulating during a rising process, promote the gas-liquid remixing, update a mass transfer surface between gas and liquid phases, and improve the oxidation efficiency; and the fluid stirrer 3 is arranged above the primary oxidizing air distributor 41, which can promote the vigorous mixing of the slurry circularly returning jets with the oxidizing air at the lower side, and improve the mass transfer efficiency and the oxidation efficiency.

Alternatively, a distance between the first gas-liquid distribution plate 11 and the second gas-liquid distribution plate 12 may be 400 mm to 600 mm, and the ammonia water distributor 2 may be located between the first gas-liquid distribution plate 11 and the second gas-liquid distribution plate 12. The first gas-liquid distribution plate 11 and the second gas-liquid distribution plate 12 also can prevent the oxidizing air from accumulating during a rising process, promote the gas-liquid remixing, update a mass transfer surface between gas and liquid phases, and improve the oxidation efficiency.

Alternatively, the first gas-liquid distribution plate 11 of the ammonia distribution zone may be arranged at a position 500 mm to 1,000 mm lower than a normal liquid level.

The size setting in the above example can make the multiple layers of gas-liquid plates fully play the role of gas-liquid and liquid-liquid mass transfer in their respective functional zones, and improve the absorption and oxidation efficiency for desulphurization.

In addition, in practical applications, the first gas-liquid distribution plate 11, the second gas-liquid distribution plate 12, the third gas-liquid distribution plate 13, and the fourth gas-liquid distribution plate 13 may be each a perforated plate with a porosity of 30% to 45%, a perforation diameter do of 5 mm to 10 mm, and a perforation spacing $d_1$=(2-5) do. The arrangement of this example is conducive to the thorough mixing of a gas and a liquid, and can improve the efficiency of gas-liquid mass transfer.

Example 4

In this example, on the basis of Example 1, 2, or 3, the absorption zone may be connected to a spray liquid circulating pump 50 through a pipeline, and the spray liquid circulating pump 50 may be connected to the spray layers 5 on an upper part of the desulphurization tower 1 through a pipeline. The spray layer can be arranged into different numbers of stages according to actual needs. In this way, a spray absorption slurry is drawn from a lower part of the absorption zone, pressurized by a circulating spray pump 50, delivered to the spray layer 5, and sprayed downward to be in countercurrent contact with a flue gas. More preferably, a mist eliminator 6 may be further provided at an upper side of the spray layer 5 in the desulphurization tower 1.

In this example, after passing through the oxidation zone to complete the oxidation for the slurry, the oxidizing air enters the absorption zone to further oxidize the slurry, and finally enters the spray layer 5 and the mist eliminator 6 through the liquid level of the tower reactor to be mixed with the flue gas and then discharged up to standard after multi-stage spraying absorption and demisting, causing no secondary pollution.

Figure 3:
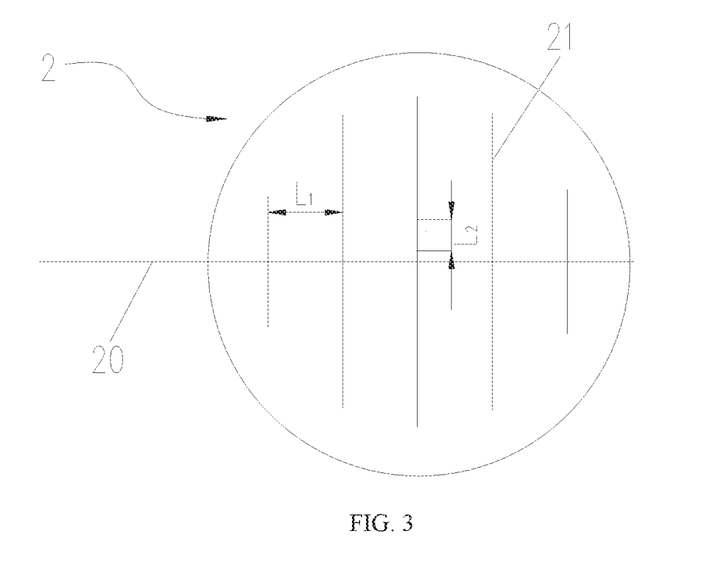
FIG. 3 is a schematic structural diagram of the ammonia water distributor according to the present disclosure.
Figure 4:
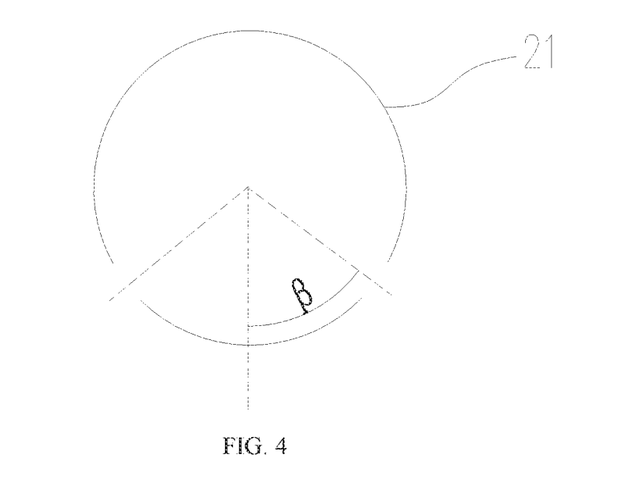
FIG. 4 is a schematic structural diagram of the ammonia water distribution branch pipe in the ammonia water distributor.

In Examples 1 to 4, the ammonia water distributor 2 may preferably be arranged as a branched distributor. As shown in FIG. 3 and FIG. 4, the distributor may include an ammonia water distribution main pipe 20 and a plurality of ammonia water distribution branch pipes 21 parallel to each other in a horizontal direction, and the ammonia water distribution main pipe 20 may be connected to the ammonia water distribution branch pipes 21;

a spacing between two adjacent ammonia water distribution branch pipes 21 may be $L_1$, two rows of distribution holes each with a diameter of $L_0$ may be formed on each ammonia water distribution branch pipe 21, and a spacing between two adjacent distribution holes in the same row may be $L_2$; the two rows of distribution holes may be symmetrically distributed in a vertical direction, and each of the two rows of distribution holes may form an included angle of β with the vertical direction; β may have a value range of 50° to 80°;

the two rows of distribution holes on the same ammonia water distribution branch pipe 21 may be staggered; and $L_1$ may have a value range of 100 mm to 200 mm, $L_2$ may have a value range of 50 mm to 150 mm, and $L_0$ may have a value range of 10 mm to 25 mm. The arrangement of the ammonia water distributor 2 in this preferred example facilitates the even distribution of ammonia water in the slurry in the tower reactor and improves the liquid-liquid mass transfer, such as to fully increase the neutralization reaction between the ammonia water absorbent and the $SO_2$-absorbed acid-rich slurry and improve the desulphurization efficiency.

Figure 5:
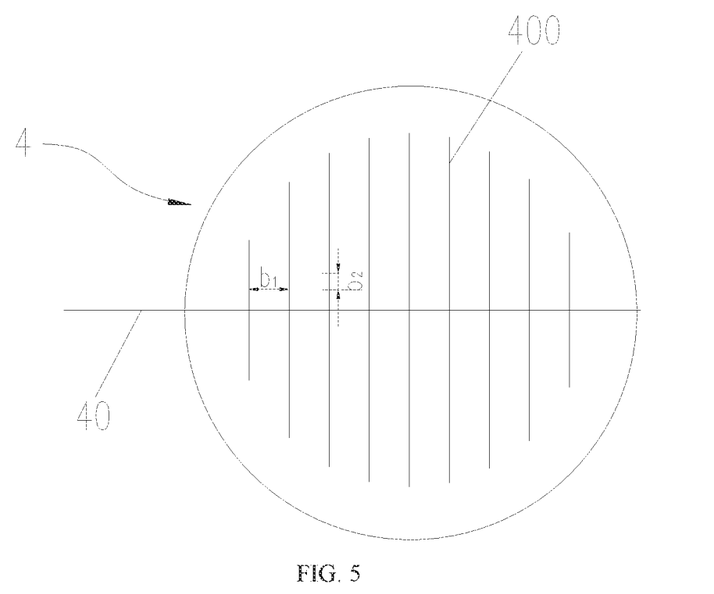
FIG. 5 is a schematic structural diagram of the oxidizing air distributor according to the present disclosure.
Figure 6:
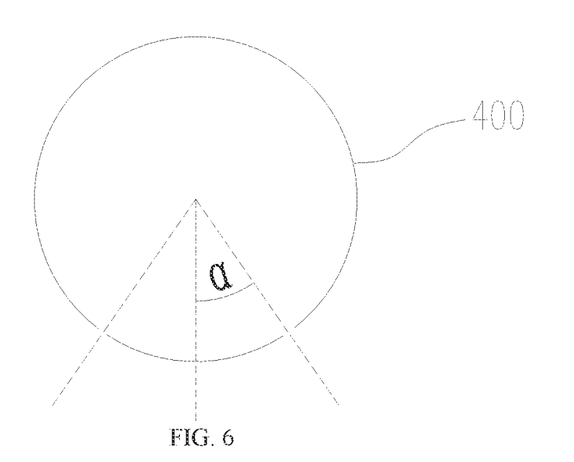
FIG. 6 is a schematic structural diagram of the oxidizing air distribution branch pipe in the oxidizing air distributor.

In Examples 1 to 4, the oxidizing air distributor may be preferably arranged as a branched distributor. As shown in FIG. 5 and FIG. 6, the distributor may include an oxidizing air distribution main pipe 40 and a plurality of oxidizing air distribution branch pipes 400 parallel to each other in the horizontal direction, and the oxidizing air distribution main pipe 40 may be connected to the oxidizing air distribution branch pipes 400;

a spacing between two adjacent oxidizing air distribution branch pipes 400 may be $b_1$, two rows of distribution holes each with a diameter of $b_0$ may be formed on each oxidizing air distribution branch pipe 400, and a spacing between two adjacent distribution holes in the same row may be $b_2$; the two rows of distribution holes may be symmetrically distributed in the vertical direction, and each of the two rows of distribution holes may form an included angle of a with the vertical direction; a may have a value range of 15° to 25°;

the two rows of holes on the same oxidizing air distribution branch pipe 400 may be staggered; and $b_1$ may have a value range of 40 mm to 100 mm, $b_2$ may have a value range of 20 mm to 50 mm, and $b_0$ may have a value range of 5 mm to 10 mm. The arrangement of the oxidizing air distributor 4 in this preferred example facilitates the uniform distribution and gas-liquid mass transfer between oxygen in the oxidizing air and the slurry, reduces the mass transfer resistance to further accelerate the oxidation reaction between the oxygen and the neutralized slurry, and improves the oxidation effectiveness.

More preferably, both the primary oxidizing air distributor 41 and the secondary oxidizing air distributor 42 may each be perforated diagonally downward (as shown in FIG. 6), and the oxidizing air coming out from the distribution holes has a large downward component velocity to generate great disturbance to the slurry within 500 mm below, which further improves the gas-liquid mixing efficiency and oxidation efficiency.

Example 5

As shown in FIG. 1, an ammonia desulphurization and oxidation method is provided in this example, including the following steps:

S1. a slurry was circularly sprayed into a tower, such that the slurry was in countercurrent contact with a $SO_2$-containing flue gas introduced into the tower, absorbed $SO_2$, and fell into the tower reactor, where the slurry falling into the tower reactor became an acid-rich slurry due to the absorption of $SO_2$ and the increase of sulfite and ammonium bisulfite contents; and the acid-rich slurry entered an ammonia distribution zone through a first gas-liquid distribution plate 11 under the action of gravity, and then was mixed with the ammonia water absorbent distributed from an ammonia water distributor 2 in the ammonia distribution zone to allow a neutralization reaction, where sulfurous acid and ammonium bisulfite were converted into ammonium sulfite and the acid-rich slurry became a neutralized slurry;

S2. under the action of gravity, the neutralized slurry moved downward, entered an absorption zone through a second gas-liquid distribution plate 12, and contacted with oxidizing air escaping from an oxidation zone, such that ammonium bisulfite was subjected to deep neutralization and ammonium sulfite was partly oxidized into ammonium sulfate; and S3. the neutralized slurry further moved downward and entered the oxidation zone through a third gas-liquid distribution plate 13, and under the action of oxidizing air distributed from a primary oxidizing air distributor and a secondary oxidizing air distributor, ammonium sulfite was fully oxidized and converted into ammonium sulfate.

As a preferred example, a pH of the ammonia distribution zone may be controlled at 7.2 to 7.8; and if the pH is lower than this range, the reaction efficiency of $NH_3$ with sulfurous acid and ammonium bisulfite is poor, and if the pH is higher than this range, it is easy to cause ammonia escape. A pH of the absorption zone may be controlled at 6 to 7; and if the pH is lower than this range, the absorption efficiency of the slurry for $SO_2$ is low, and if the pH is higher than this range, it is easy to cause ammonia escape. A pH of the oxidation zone may be controlled at 4.5 to 6; and if the pH is lower than this range, ammonium bisulfate increases, which is easy to cause gas phase decomposition and equipment corrosion of the ammonium sulfate concentration unit, and if the pH is higher than this range, the oxidation efficiency is reduced.

As another preferred example, ammonia water used as an absorbent in the ammonia water distributor 2 may have a concentration of 1 wt % to 4 wt %.

More preferably, in S1, an absorption liquid was delivered by a spray liquid circulating pump from the absorption zone in the tower to a top of the tower, and then circularly sprayed to absorb $SO_2$; and a $SO_2$-removed gas rose into a mist eliminator, and was demisted and then discharged up to standard.

More preferably, in S3, the slurry was drawn from a bottom of the tower by a stirring/circulating pump, and circulated to a fluid stirrer 3 on an upper part of a primary oxidizing air distributor 41 to form a tangential jet, which drove the vigorous mixing of oxidizing air in the oxidation zone with the slurry (a spiral tangential jet formed by the fluid stirrer drove the vigorous mixing of the oxidizing air and the slurry in the lower part; and since the slurry was drawn from the lower part to the upper part, the oxidation zone was in a fully mixed state); a fourth gas-liquid distribution plate above a secondary oxidizing air distributor 42 synchronously promoted the gas-liquid mass transfer in the oxidation zone, such that the neutralized slurry was fully oxidized to obtain an ammonium sulfate solution; and an ammonium sulfate extraction port was formed on the stirring/circulating pump 33 to quantitatively discharge an ammonium sulfate solution into an ammonium sulfate concentration unit.

In this example, an ammonia distribution zone, an absorption zone, and an oxidation zone are formed from top to bottom in the desulphurization tower reactor through non-mechanical partition, and a pH of the slurry is controlled to gradually decrease from top to bottom; the ammonia distribution zone and absorption zone with high pH ensures the high absorption efficiency of the slurry for $SO_2$, and the circulating spray of sampled slurry in the absorption zone also ensures the high absorption efficiency of the sprayed slurry for $SO_2$ in a flue gas sent to the desulphurization tower 1; in the oxidation zone, with the increase of ammonium sulfate concentration, the pH gradually decreases to achieve high oxidation efficiency, such that ammonium sulfite is fully oxidized and converted into ammonium sulfate; and an ammonium sulfate extraction port is formed on the stirring/circulating pump 33 to quantitatively discharge an ammonium sulfate solution into an ammonium sulfate concentration unit. It is avoided that unoxidized ammonium sulfite will be decomposed in an ammonium sulfate concentration operation to release ammonia and acid gases, resulting in odor in an operating room, environmental and equipment corrosion, and the like.

Application Example 6

The following ammonia desulphurization and oxidation apparatus including a desulphurization tower 1 is adopted: a mist eliminator 6, spray layers in multiple stages 5, and a tower reactor are sequentially arranged from top to bottom in the desulphurization tower 1; a first gas-liquid distribution plate 11, a second gas-liquid distribution plate 12, and a third gas-liquid distribution plate 13 are sequentially arranged from top to bottom in the tower reactor;

an ammonia distribution zone is formed between the first gas-liquid distribution plate 11 and the second gas-liquid distribution plate 12, and an ammonia water distributor 2 is further arranged between the first gas-liquid distribution plate 11 and the second gas-liquid distribution plate 12 in the ammonia distribution zone;

an absorption zone is formed between the second gas-liquid distribution plate 12 and the third gas-liquid distribution plate 13;

an oxidation zone is formed between the third gas-liquid distribution plate 13 and a bottom of the tower, and a secondary oxidizing air distributor 42, a fourth gas-liquid distribution plate 14, a primary oxidizing air distributor 41, and a fluid stirrer 3 are sequentially arranged from bottom to top in the oxidation zone.

A distance between the two stages of oxidizing air distributors is 1,500 mm, a distance between the secondary oxidizing air distributor 42 and the bottom of the tower is 700 mm, the fourth gas-liquid distribution plate 14 is located 400 mm above the secondary oxidizing air distributor 42, the fluid stirrer 3 is arranged 700 mm above the primary oxidizing air distributor 41, the third gas-liquid distribution plate 13 is located 200 mm above the fluid stirrer 3, a circulating spray liquid sampling port is formed 200 mm above the third gas-liquid distribution plate 13, a second gas-liquid distribution plate 12 is arranged 1,500 mm above the circulating spray liquid sampling port, a distance between the second gas-liquid distribution plate 12 and the first gas-liquid distribution plate 11 is 500 mm, and the ammonia water distributor 2 is located between the first gas-liquid distribution plate 11 and the second gas-liquid distribution plate 12.

The following ammonia desulphurization and oxidation method is implemented:

S1. a slurry was circularly sprayed into a tower, such that the slurry was in countercurrent contact with a $SO_2$-containing flue gas (a $SO_2$ content in the flue gas was 3,000 mg/Nm$^3$) introduced into the desulphurization tower 1, and specifically, an absorption liquid was pumped by the spray liquid circulating pump 50 from the absorption zone in the tower to a top of the tower, and circularly sprayed to absorb $SO_2$; a $SO_2$-removed gas rose into the mist eliminator 6, and then was discharged up to standard after being demisted; a $SO_2$-absorbed slurry fell into the tower reactor, where the slurry falling into the tower reactor became an acid-rich slurry due to the absorption of $SO_2$ and the increase of sulfite and ammonium bisulfite contents; and the acid-rich slurry entered an ammonia distribution zone through a first gas-liquid distribution plate 11 under the action of gravity, and then was mixed with ammonia water at a concentration of 2 wt % distributed from an ammonia water distributor 2 in the ammonia distribution zone to allow a neutralization reaction, where a pH in the ammonia distribution zone was controlled at 7.5, sulfurous acid and ammonium bisulfite were converted into ammonium sulfite, and the acid-rich slurry became a neutralized slurry;

S2. under the action of gravity, the neutralized slurry moved downward, entered an absorption zone through a second gas-liquid distribution plate 12 (a pH in the absorption zone was controlled at 7), and contacted with oxidizing air escaping from an oxidation zone to complete a gas-liquid redistribution, such that ammonium bisulfite was subjected to deep neutralization and ammonium sulfite was partly oxidized into ammonium sulfate; and S3. the neutralized slurry further moved downward and entered the oxidation zone through a third gas-liquid distribution plate 13 (a pH of the oxidation zone was controlled at 5.8), and under the action of oxidizing air distributed from a primary oxidizing air distributor 41 and a secondary oxidizing air distributor 42, ammonium sulfite was fully oxidized and converted into ammonium sulfate. Specifically, the slurry was drawn from a bottom of the tower by a stirring/circulating pump 33, and circulated to a fluid stirrer 3 on an upper part of a primary oxidizing air distributor 41 to form a spiral tangential jet, which drove the vigorous mixing of the oxidizing air and the slurry in the lower part; since the slurry was drawn from the lower part to the upper part, the oxidation zone was in a fully mixed state; a fourth gas-liquid distribution plate 14 above a secondary oxidizing air distributor 42 synchronously promoted the gas-liquid mass transfer in the oxidation zone, such that the full oxidation in the oxidation zone was promoted to obtain an ammonium sulfate solution; and an ammonium sulfate extraction port was formed on the stirring/circulating pump 33 to quantitatively discharge an ammonium sulfate solution into an ammonium sulfate concentration unit.

After desulphurization in this application example, there is no peculiar smell in the ammonium sulfate concentration workshop (if there is ammonium sulfite, it will be decomposed into ammonia and $SO_2$ to produce a peculiar smell). A relative mass percentage of ammonium sulfate and ammonium sulfite in an ammonium sulfate product is 99.5:0.5, and a $SO_2$ content in a purified flue gas is 0.5 mg/Nm$^3$. Thus, the final oxidative desulphurization effect is as follows: oxidation efficiency: 99.5%, and desulphurization efficiency: 99.98%.

Application Example 7

This application example is different from Application Example 6 only in that: In the ammonia desulphurization and oxidation apparatus, a distance between the two stages of oxidizing air distributors is 1,300 mm, a distance between the secondary oxidizing air distributor 42 and the bottom of the tower is 800 mm, the fourth gas-liquid distribution plate 14 is located 400 mm above the secondary oxidizing air distributor 42, the fluid stirrer 3 is arranged 700 mm above the primary oxidizing air distributor 41, the third gas-liquid distribution plate 13 is located 200 mm above the fluid stirrer 3, a circulating spray liquid sampling port is formed 200 mm above the third gas-liquid distribution plate 13, a second gas-liquid distribution plate 12 is arranged 1,500 mm above the circulating spray liquid sampling port, a distance between the second gas-liquid distribution plate 12 and the first gas-liquid distribution plate 11 is 400 mm, and the ammonia water distributor 2 is located between the first gas-liquid distribution plate 11 and the second gas-liquid distribution plate 12.

In the ammonia desulphurization and oxidation method, ammonia water with a concentration of 1 wt % is used as the absorbent, the pH in the ammonia distribution zone is controlled at 7.2, the pH in the absorption zone is controlled at 6, and the pH in the oxidation zone is controlled at 5.5.

The final oxidative desulphurization effect obtained in this application example is as follows: oxidation efficiency: 99.6%, and desulphurization efficiency: 99.94%.

Application Example 8

This application example is different from Application Example 6 only in that:

In the ammonia desulphurization and oxidation apparatus, a distance between the two stages of oxidizing air distributors is 2,000 mm, a distance between the secondary oxidizing air distributor 42 and the bottom of the tower is 700 mm, the fourth gas-liquid distribution plate 14 is located 300 mm above the secondary oxidizing air distributor 42, the fluid stirrer 3 is arranged 500 mm above the primary oxidizing air distributor 41, the third gas-liquid distribution plate 13 is located 300 mm above the fluid stirrer 3, a circulating spray liquid sampling port is formed 200 mm above the third gas-liquid distribution plate 13, a second gas-liquid distribution plate 12 is arranged 1,800 mm above the circulating spray liquid sampling port, a distance between the second gas-liquid distribution plate 12 and the first gas-liquid distribution plate 11 is 400 mm, and the ammonia water distributor 2 is located between the first gas-liquid distribution plate 11 and the second gas-liquid distribution plate 12.

In the ammonia desulphurization and oxidation method, ammonia water with a concentration of 4 wt % is used as the absorbent, the pH in the ammonia distribution zone is controlled at 7.4, the pH in the absorption zone is controlled at 6.8, and the pH in the oxidation zone is controlled at 5.5.

The final oxidative desulphurization effect obtained in this application example is as follows: oxidation efficiency: 99.8%, and desulphurization efficiency: 99.95%.

Application Example 9

This application example is different from Application Example 6 only in that:

In the ammonia desulphurization and oxidation apparatus, a distance between the two stages of oxidizing air distributors is 1,500 mm, a distance between the secondary oxidizing air distributor 42 and the bottom of the tower is 700 mm, the fourth gas-liquid distribution plate 14 is located 400 mm above the secondary oxidizing air distributor 42, the fluid stirrer 3 is arranged 700 mm above the primary oxidizing air distributor 41, the third gas-liquid distribution plate 13 is located 200 mm above the fluid stirrer 3, a circulating spray liquid sampling port is formed 200 mm above the third gas-liquid distribution plate 13, a second gas-liquid distribution plate 12 is arranged 1,500 mm above the circulating spray liquid sampling port, a distance between the second gas-liquid distribution plate 12 and the first gas-liquid distribution plate 11 is 500 mm, and the ammonia water distributor 2 is located between the first gas-liquid distribution plate 11 and the second gas-liquid distribution plate 12.

In the ammonia desulphurization and oxidation method, ammonia water with a concentration of 2 wt % is used as the absorbent, the pH in the ammonia distribution zone is controlled at 7.2, the pH in the absorption zone is controlled at 6.8, and the pH in the oxidation zone is controlled at 5.5.

The final oxidative desulphurization effect obtained in this application example is as follows: oxidation efficiency: 99.6%, and desulphurization efficiency: 99.98%.

Application Example 10

This application example is different from Application Example 6 only in that:

In the ammonia desulphurization and oxidation apparatus, a distance between the two stages of oxidizing air distributors is 2,000 mm, a distance between the secondary oxidizing air distributor 42 and the bottom of the tower is 700 mm, the fourth gas-liquid distribution plate 14 is located 300 mm above the secondary oxidizing air distributor 42, the fluid stirrer 3 is arranged 500 mm above the primary oxidizing air distributor 41, the third gas-liquid distribution plate 13 is located 300 mm above the fluid stirrer 3, a circulating spray liquid sampling port is formed 200 mm above the third gas-liquid distribution plate 13, a second gas-liquid distribution plate 12 is arranged 1,800 mm above the circulating spray liquid sampling port, a distance between the second gas-liquid distribution plate 12 and the first gas-liquid distribution plate 11 is 400 mm, and the ammonia water distributor 2 is located between the first gas-liquid distribution plate 11 and the second gas-liquid distribution plate 12.

In the ammonia desulphurization and oxidation method, ammonia water with a concentration of 3 wt % is used as the absorbent, the pH in the ammonia distribution zone is controlled at 7.8, the pH in the absorption zone is controlled at 7, and the pH in the oxidation zone is controlled at 6.0.

The final oxidative desulphurization effect obtained in this application example is as follows: oxidation efficiency: 99.2%, and desulphurization efficiency: 99.97%.

Application Example 11

This application example is different from Application Example 6 only in that:

In the ammonia desulphurization and oxidation apparatus, a distance between the two stages of oxidizing air distributors is 1800 mm, a distance between the secondary oxidizing air distributor 42 and the bottom of the tower is 700 mm, the fourth gas-liquid distribution plate 11 is located 300 mm above the secondary oxidizing air distributor 42, the fluid stirrer 3 is arranged 500 mm above the primary oxidizing air distributor 41, the third gas-liquid distribution plate 13 is located 300 mm above the fluid stirrer 3, a circulating spray liquid sampling port is formed 200 mm above the third gas-liquid distribution plate 13, a second gas-liquid distribution plate 12 is arranged 1,800 mm above the circulating spray liquid sampling port, a distance between the second gas-liquid distribution plate 12 and the first gas-liquid distribution plate 11 is 400 mm, and the ammonia water distributor 2 is located between the first gas-liquid distribution plate 11 and the second gas-liquid distribution plate 12.

In the ammonia desulphurization and oxidation method, ammonia water with a concentration of 3 wt % is used as the absorbent, the pH in the ammonia distribution zone is controlled at 7.2, the pH in the absorption zone is controlled at 6, and the pH in the oxidation zone is controlled at 4.5.

The final oxidative desulphurization effect obtained in this application example is as follows: oxidation efficiency: 99.8%, and desulphurization efficiency: 99.6%.

Comparative Example 12

In this comparative example, there is no first gas-liquid distribution plate 11, second gas-liquid distribution plate 12, and third gas-liquid distribution plate 13 in the tower reactor; although there is circulating stirring, there is no fluid distribution pipe 31; and there is only the primary oxidizing air distributor 41, there is no secondary oxidizing air distributor 42, and correspondingly, there is also no fourth gas-liquid distribution plate 14.

S1. a slurry was circularly sprayed into a tower, such that the slurry was in countercurrent contact with a $SO_2$-containing flue gas (a $SO_2$ content in the flue gas was 3,000 mg/Nm$^3$) introduced into the desulphurization tower 1, and specifically, an absorption liquid was pumped by the spray liquid circulating pump 50 from the tower reactor to a top of the tower, and circularly sprayed to absorb $SO_2$; a $SO_2$-removed gas rose into the mist eliminator 6, and then was discharged up to standard after being demisted; a $SO_2$-absorbed slurry fell into the tower reactor, where the slurry falling into the tower reactor became an acid-rich slurry due to the absorption of $SO_2$ and the increase of sulfite and ammonium bisulfite contents; and the acid-rich slurry entered the tower reactor under the action of gravity (a pH of the tower reactor was controlled at 6.2), and then was mixed with ammonia water at a concentration of 2 wt % distributed from an ammonia water distributor 2 to allow a neutralization reaction, where sulfurous acid and ammonium bisulfite were converted into ammonium sulfite, and the acid-rich slurry became a neutralized slurry;

S2. the neutralized slurry moved downward under the action of gravity, and under the action of oxidizing air distributed from the primary oxidizing air distributor 41, ammonium sulfite was oxidized and converted into ammonium sulfate; and Specifically, the slurry was drawn from a bottom of the tower by a stirring/circulating pump 33, and circulated to an upper part of a primary oxidizing air distributor 41, such that the slurry was subjected to circulating stirring and the oxidation was promoted to obtain an ammonium sulfate solution; and an ammonium sulfate extraction port was formed on the stirring/circulating pump 33 to quantitatively discharge an ammonium sulfate solution into an ammonium sulfate concentration unit.

The final oxidative desulphurization effect obtained in this comparative example is as follows: oxidation efficiency: 86.15%, and desulphurization efficiency: 97.38%. In this comparative example, due to the lack of partition, the neutralization reaction of the acid-rich slurry with ammonia water and the oxidation reaction for converting ammonium sulfite into ammonium sulfate both are not conducted within an appropriate reaction pH range, which significantly reduces the neutralization efficiency and oxidation efficiency and also adversely affects the absorption efficiency.

Comparative Example 13

This comparative example is different from Comparative Example 12 only in that:

In the ammonia desulphurization and oxidation method: a pH of the tower reactor is controlled at 6.8.

The final oxidative desulphurization effect obtained in this comparative example is as follows: oxidation efficiency: 84.69%, and desulphurization efficiency: 98.75%. Due to the lack of partition, the neutralization reaction of the acid-rich slurry with ammonia water and the oxidation reaction for converting ammonium sulfite into ammonium sulfate both are not conducted within an appropriate reaction pH range, which significantly reduces the neutralization efficiency and oxidation efficiency and also adversely affects the absorption efficiency.

Comparative Example 14

This comparative example is different from Application Example 7 only in that:

In the apparatus: in the oxidation zone, only the primary oxidizing air distributor 41 is arranged and the secondary oxidizing air distributor 42 is omitted; and no fluid distribution pipe 31 is arranged.

Correspondingly, in the ammonia desulphurization and oxidation method: S3. the neutralized slurry further moves downward and enters the oxidation zone through a third gas-liquid distribution plate 13, and under the action of oxidizing air distributed from a primary oxidizing air distributor 41, ammonium sulfite is oxidized and converted into ammonium sulfate. Specifically, the slurry is drawn from a bottom of the tower by a stirring/circulating pump 33, and circulated to an upper part of a primary oxidizing air distributor 41, such that the slurry is subjected to circulating stirring and the oxidation in the oxidation zone is promoted to obtain an ammonium sulfate solution. A pH in the ammonia distribution zone is controlled at 7.4, a pH in the absorption zone is controlled at 6.5, and a pH in the oxidation zone is controlled at 5.5.

The final oxidative desulphurization effect obtained in this comparative example is as follows: oxidation efficiency: 90.65%, and desulphurization efficiency: 98.98%. In this comparative example, the oxidation zone only has primary oxidizing air distribution, and has no secondary oxidizing air distribution and efficient fluid stirring, which reduces the oxidation efficiency and correspondingly reduces a yield of ammonium sulfate in the ammonium sulfate product.

Comparative Example 15

This comparative example is different from Application Example 7 only in that:

In the apparatus: in the oxidation zone, only the primary oxidizing air distributor 41 is arranged and no secondary oxidizing air distributor 42 is arranged.

Correspondingly, in the ammonia desulphurization and oxidation method: S3. the neutralized slurry further moves downward and enters the oxidation zone through a third gas-liquid distribution plate 13, and under the action of oxidizing air distributed from a primary oxidizing air distributor 41, ammonium sulfite is oxidized and converted into ammonium sulfate. Specifically, the slurry is drawn from a bottom of the tower by a stirring/circulating pump 33, and circulated to a fluid stirrer 3 on an upper part of a primary oxidizing air distributor 41 to form a spiral tangential jet, which drives the vigorous mixing of the oxidizing air and the slurry in the lower part; since the slurry is drawn from the lower part to the upper part, the oxidation zone is in a fully mixed state, which promotes the oxidation in the oxidation zone, where a pH in the ammonia distribution zone is controlled at 7.2, a pH in the absorption zone is controlled at 5.8, and a pH in the oxidation zone is controlled at 5.3.

The final oxidative desulphurization effect obtained in this comparative example is as follows: oxidation efficiency: 94.79%, and desulphurization efficiency: 96.46%. This indicates that, when the pH of the absorption zone is reduced to a specified range, the absorption efficiency of the slurry for $SO_2$ will be significantly reduced, and correspondingly, the oxidation efficiency is also adversely affected as there is only the primary oxidizing air distribution.

Comparative Example 16

This comparative example is different from Application Example 8 only in that there is no first gas-liquid distribution plate 11, second oxidizing air distributor 42, ammonia water distributor 2, and fluid distribution pipe 31.

In the ammonia desulphurization and oxidation method: a pH in the ammonia distribution zone is controlled at 7.0, a pH in the absorption zone is controlled at 5.5, and a pH in the oxidation zone is controlled at 5.0.

The final oxidative desulphurization effect obtained in this comparative example is as follows: oxidation efficiency: 91.68%, and desulphurization efficiency: 93.5%. This indicates that, because there is no ammonia water distributor in this comparative example, the mixing uniformity of ammonia water with the absorption liquid is poor, and the pH in the ammonia distribution zone is low, which results in poor reaction efficiency of $NH_3$ with sulfurous acid and ammonium $b_1$ sulfite and adversely affects the desulphurization efficiency; and the pH in the absorption zone is low, which increases ammonium bisulfate and easily reduces the $SO_2$ absorption efficiency. In addition, the lack of the first gas-liquid distribution plate and the secondary oxidizing air distributor makes the oxidation effect of gas-liquid contact relying on gas-liquid mass transfer poor and makes the oxidation efficiency low.

Comparative Example 17

This comparative example is different from Application Example 8 only in that:

In the ammonia desulphurization and oxidation method: a pH in the ammonia distribution zone is controlled at 8.0, a pH in the absorption zone is controlled at 7.2, and a pH in the oxidation zone is controlled at 6.2.

The final oxidative desulphurization effect obtained in this comparative example is as follows: oxidation efficiency: 83.38%, and desulphurization efficiency: 99.46%. Due to the high pH in the ammonia distribution zone and the high pH in the absorption zone, although the $SO_2$ absorption efficiency is high, an ammonia escape amount at the top of the tower is high; and the high pH in the oxidation zone significantly reduces the oxidation efficiency, and the unoxidized ammonium sulfite will be decomposed in an ammonium sulfate concentration operation to release ammonia and acid gases, such that an ammonium sulfate yield of the whole system is correspondingly reduced.

Comparative Example 19

This comparative example is different from Application Example 8 only in that:

In the ammonia desulphurization and oxidation method: a pH in the ammonia distribution zone is controlled at 6.8, a pH in the absorption zone is controlled at 5.0, and a pH in the oxidation zone is controlled at 4.0.

The final oxidative desulphurization effect obtained in this comparative example is as follows: oxidation efficiency: 99.58%, and desulphurization efficiency: 89.66%. Due to the low pH of the oxidation zone, the low pH of the ammonia distribution zone, and the low pH of the absorption zone, although the oxidation efficiency is high, the desulphurization efficiency is low; and ammonium bisulfate in the slurry increases, which not only easily causes the gas phase decomposition and equipment corrosion of the ammonium sulfate concentration unit, but also affects the desulphurization efficiency.

It should be noted that the above-mentioned examples can be freely combined as required, and many other combinations are not described here. The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. An ammonia desulphurization and oxidation apparatus, comprising a desulphurization tower, wherein spray layers in multiple stages and a tower reactor are sequentially arranged from top to bottom in the desulphurization tower;
a first gas-liquid distribution plate, a second gas-liquid distribution plate, and a third gas-liquid distribution plate are sequentially arranged from top to bottom in the tower reactor;
an ammonia distribution zone is formed between the first gas-liquid distribution plate and the second gas-liquid distribution plate, and an ammonia water distributor is further arranged between the first gas-liquid distribution plate and the second gas-liquid distribution plate in the ammonia distribution zone;
an absorption zone is formed between the second gas-liquid distribution plate and the third gas-liquid distribution plate;
an oxidation zone is formed between the third gas-liquid distribution plate and a bottom of the desulphurization tower; in the oxidation zone, oxidizing air distributors in multiple stages are arranged at a lower side of the third gas-liquid plate, and each of the oxidizing air distributors in multiple stages is correspondingly provided with a gas-liquid plate; and a fluid stirrer for increasing gas-liquid contact is further arranged above the oxidizing air distributors.

2. The ammonia desulphurization and oxidation apparatus according to claim 1, wherein
a secondary oxidizing air distributor, a fourth gas-liquid distribution plate, a primary oxidizing air distributor, and the fluid stirrer are sequentially arranged from bottom to top between the third gas-liquid distribution plate and the bottom of the desulphurization tower in the oxidation zone.

3. The ammonia desulphurization and oxidation apparatus according to claim 2, wherein a distance between the primary oxidizing air distributor and the secondary oxidizing air distributor is 1,000 mm to 2,000 mm, and a distance between the secondary oxidizing air distributor and the bottom of the desulphurization tower is 700 mm to 1,000 mm; and/or, the fourth gas-liquid distribution plate is arranged 300 mm to 500 mm above the secondary oxidizing air distributor, the fluid stirrer is arranged 500 mm to 800 mm above the primary oxidizing air distributor, and the third gas-liquid distribution plate is arranged 200 mm to 300 mm above the fluid stirrer; and/or, a distance between the first gas-liquid distribution plate and the second gas-liquid distribution plate is 400 mm to 600 mm, and the ammonia water distributor is located between the first gas-liquid distribution plate and the second gas-liquid distribution plate; and/or, the first gas-liquid distribution plate of the ammonia distribution zone is arranged at a position 500 mm to 1,000 mm lower than a normal liquid level.

4. The ammonia desulphurization and oxidation apparatus according to claim 2, wherein each of the first gas-liquid distribution plate, the second gas-liquid distribution plate, the third gas-liquid distribution plate, and the fourth gas-liquid distribution plate is a perforated plate with a porosity of 30% to 45%, a perforation diameter $d_0$ of 5 mm to 10 mm, and a perforation spacing $d_1=(2-5) d_0$.

5. The ammonia desulphurization and oxidation apparatus according to claim 2, wherein the fluid stirrer comprises a closed coil pipe and a plurality of fluid distribution pipes on the closed coil pipe that communicate with the closed coil pipe; and the fluid distribution pipes are each a short pipe that is inclined downward and forms an included angle α with a tangent line of the closed coil pipe;

the fluid stirrer communicates with a stirring/circulating pump located outside the desulphurization tower through a fluid conveying pipe; and the stirring/circulating pump communicates with the bottom of the desulphurization tower.

6. The ammonia desulphurization and oxidation apparatus according to claim 1, wherein the fluid stirrer comprises a closed coil pipe and a plurality of fluid distribution pipes on the closed coil pipe that communicate with the closed coil pipe; and the fluid distribution pipes are each a short pipe that is inclined downward and forms an included angle α with a tangent line of the closed coil pipe;

the fluid stirrer communicates with a stirring/circulating pump located outside the desulphurization tower through a fluid conveying pipe; and the stirring/circulating pump communicates with the bottom of the desulphurization tower.

7. The ammonia desulphurization and oxidation apparatus according to claim 1, wherein the absorption zone is connected to a spray liquid circulating pump through a pipeline, and the spray liquid circulating pump is connected to the spray layers on an upper part of the desulphurization tower through a pipeline; and a mist eliminator is further provided at an upper side of the spray layers in the desulphurization tower.

8. The ammonia desulphurization and oxidation apparatus according to claim 1, wherein the ammonia water distributor is arranged as a first branched distributor comprising an ammonia water distribution main pipe and a plurality of ammonia water distribution branch pipes parallel to each other in a horizontal direction, and the ammonia water distribution main pipe is connected to the ammonia water distribution branch pipes;

a spacing between two adjacent ammonia water distribution branch pipes is $L_1$, two rows of first distribution holes each with a diameter of $L_0$ are formed on each of the ammonia water distribution branch pipes, and a spacing between two adjacent first distribution holes in the same row is $L_2$; the two rows of first distribution holes are symmetrically distributed in a vertical direction, and each of the two rows of first distribution holes forms an included angle of β with the vertical direction, wherein β has a value range of 50° to 80°;

the two rows of first distribution holes on the same ammonia water distribution branch pipe are staggered; $L_1$ has a value range of 100 mm to 200 mm, $L_2$ has a value range of 50 mm to 150 mm, and $L_0$ has a value range of 10 mm to 25 mm;

and/or, the oxidizing air distributor is arranged as a second branched distributor comprising an oxidizing air distribution main pipe and a plurality of oxidizing air distribution branch pipes parallel to each other in the horizontal direction, and the oxidizing air distribution main pipe is connected to the oxidizing air distribution branch pipes;

a spacing between two adjacent oxidizing air distribution branch pipes is $b_1$, two rows of second distribution holes each with a diameter of $b_0$ are formed on each of the oxidizing air distribution branch pipes, and a spacing between two adjacent second distribution holes in the same row is $b_2$; the two rows of second distribution holes are symmetrically distributed in the vertical direction, and each of the two rows of second distribution holes forms an included angle of a with the vertical direction, wherein a has a value range of 15° to 25°;

the two rows of second distribution holes on the same oxidizing air distribution branch pipe are staggered; and $b_1$ has a value range of 40 mm to 100 mm, $b_2$ has a value range of 20 mm to 50 mm, and $b_0$ has a value range of 5 mm to 10 mm.

9. An ammonia desulphurization and oxidation method, comprising the following steps:

S1, circularly spraying a slurry in a tower, such that the slurry is in countercurrent contact with a $SO_2$-containing flue gas and absorbs $SO_2$ to form an acid-rich slurry, and the acid-rich slurry falls down and enters an ammonia distribution zone through a first gas-liquid distribution plate under an action of gravity, and then is mixed with ammonia water distributed from an ammonia water distributor in the ammonia distribution zone to allow a neutralization reaction, wherein sulfurous acid and ammonium bisulfite are converted into ammonium sulfite and the acid-rich slurry becomes a neutralized slurry;

S2, under the action of gravity, allowing the neutralized slurry to move downward, enter an absorption zone through a second gas-liquid distribution plate, and contact with oxidizing air escaping from an oxidation zone, such that the ammonium bisulfite is subjected to deep neutralization and the ammonium sulfite is partly oxidized into ammonium sulfate; and S3, allowing the neutralized slurry to further move downward and enter the oxidation zone through a third gas-liquid distribution plate, and under an action of oxidizing air distributed from oxidizing air distributors in multiple stages, allowing the ammonium sulfite to be fully oxidized and converted into the ammonium sulfate.

10. The ammonia desulphurization and oxidation method according to claim 9, wherein
a pH of the ammonia distribution zone is controlled at 7.2 to 7.8;
a pH of the absorption zone is controlled at 6 to 7; and
a pH of the oxidation zone is controlled at 4.5 to 6.

11. The ammonia desulphurization and oxidation method according to claim 9, wherein
in S1, an absorption liquid is delivered by a spray liquid circulating pump from the absorption zone in the tower to a top of the tower, and then circularly sprayed to absorb $SO_2$; and a $SO_2$-removed gas rises into a mist eliminator, and is demisted and then discharged up to standard;

and/or, in S3, the neutralized slurry is drawn from a bottom of the tower by a stirring/circulating pump, and circulated to a fluid stirrer on an upper part of a primary oxidizing air distributor to form a tangential jet, and the tangential jet drives a vigorous mixing of oxidizing air in the oxidation zone with the neutralized slurry; a fourth gas-liquid distribution plate above a secondary oxidizing air distributor synchronously promotes a gas-liquid mass transfer in the oxidation zone, such that the neutralized slurry is fully oxidized to obtain an ammonium sulfate solution; and an ammonium sulfate extraction port is formed on the stirring/circulating pump to quantitatively discharge the ammonium sulfate solution into an ammonium sulfate concentration unit.

* * * * *